United States Patent [19]

Cohen

[11] 4,310,022
[45] Jan. 12, 1982

[54] FLUID DISTRIBUTOR SYSTEM

[75] Inventor: William Cohen, Kibbutz Givat Chaim-Ichud, Israel

[73] Assignee: Givat Chaim-Ichud, Kibbutz Givat Chaim-Ichud, Israel

[21] Appl. No.: 147,479

[22] Filed: May 7, 1980

[51] Int. Cl.³ .............................................. F16K 11/02
[52] U.S. Cl. ........................ 137/624.18; 137/625.11; 137/625.46; 251/161
[58] Field of Search ................... 137/624.11, 624.18, 137/624.2, 625.11, 625.46, 625.21; 251/160, 161

[56] References Cited

U.S. PATENT DOCUMENTS

| | | | |
|---|---|---|---|
| 3,074,431 | 1/1963 | Schwartz | 137/625.11 |
| 3,440,434 | 4/1969 | Yates | 137/624.2 X |
| 3,780,766 | 12/1973 | Link | 137/624.2 |
| 4,156,437 | 5/1979 | Chivens | 251/161 X |

*Primary Examiner*—Alan Cohan
*Attorney, Agent, or Firm*—Benjamin J. Barish

[57] ABSTRACT

A fluid distributor system is described comprising a circular distributor plate formed with a central opening connected at one side of the plate to a fluid inlet pipe, and a plurality of outlet openings arranged in a circular array around the outer periphery of the distributor plate and each connected at said one side of the plate to one of a plurality of outlet pipes. A rotary distributor arm is rotatably mounted on an axis passing through the center of the distributor plate and in spaced relationship with respect to its opposite side. The distributor arm is formed with a passageway having an inlet at its center aligned with the inlet opening, and an outlet at its end selectively alignable with one of the peripheral outlet openings according to the selected rotary position of the distributor arm. The system further includes rotary drive means for rotating the distributor arm to a selected rotary position, and axial drive means effective, when the distributor arm is rotated to a selected position, to move the distributor arm axially against the distributor plate to bring the inlet end of the distributor arm passageway into communication with the discharge plate inlet opening, and the outlet end of the distributor arm passageway into communication with the selected outlet opening of the distributor plate.

10 Claims, 6 Drawing Figures

FLUID DISTRIBUTOR SYSTEM

BACKGROUND OF THE INVENTION

The present invention relates to a fluid distributor system, and particularly to one which may be controlled so as to distribute one or more fluids from an inlet pipe to a selected one of a large number (e.g. many tens) of outlet pipes. The invention is particularly useful in cow milking machines for controlling the supply of water and/or air in order to effect rinsing and/or drying operations with respect to the many milking cups of the machine, and the invention is therefore described below with respect to this application.

A number of systems have been proposed for distributing fluids to a plurality of outlets, and particularly for rinsing and/or drying the milking cups in cow milking machines, but the known systems are usually very complicated in construction and therefore costly to produce, and/or are extremely limited in the number of outlets they can accommodate.

BRIEF SUMMARY OF THE INVENTION

An object of the present invention is to provide a fluid distributor system which is of relatively simple construction and which can accommodate an extremely large number of different outlets for selectively directing one or more fluids.

According to one aspect of the present invention, there is provided a fluid distributor system, comprising: a circular distributor plate formed with a central opening connected at one side of the plate to a fluid inlet pipe, and a plurality of outlet openings arranged in a circular array around the outer periphery of the distributor plate and each connected at said one side of the plate to one of a plurality of outlet pipes; a rotary distributor arm rotatably mounted on an axis passing through the center of said distributor plate and in space relationship with respect to its opposite side. The distributor arm is formed with a passageway having an inlet at its center aligned with said inlet opening, and an outlet at its end selectively alignable with one of said peripheral outlet openings according to the selected rotary position of the distributor arm. The system further includes rotary drive means for rotating the distributor arm to a selected rotary position; and axial drive means, in the form of a fluid motor having a cylinder and piston, effective, when the distributor arm is rotated to a selected position, to move the distributor arm axially against the distributor plate to bring the inlet end of the distributor arm passageway into communication with the discharge plate inlet opening, and the outlet end of the distributor arm passageway into communication with the selected outlet opening of the distributor plate.

Further features and advantages of the invention will be apparent from the description below.

BRIEF DESCRIPTION OF THE DRAWINGS

The invention is herein described, by way of example only, with reference to the accompanying drawings, wherein:

FIG. 6 is a schematic diagram of the electrical circuit in the apparatus of FIG. 1.

DESCRIPTION OF A PREFERRED EMBODIMENT

Figure 1:
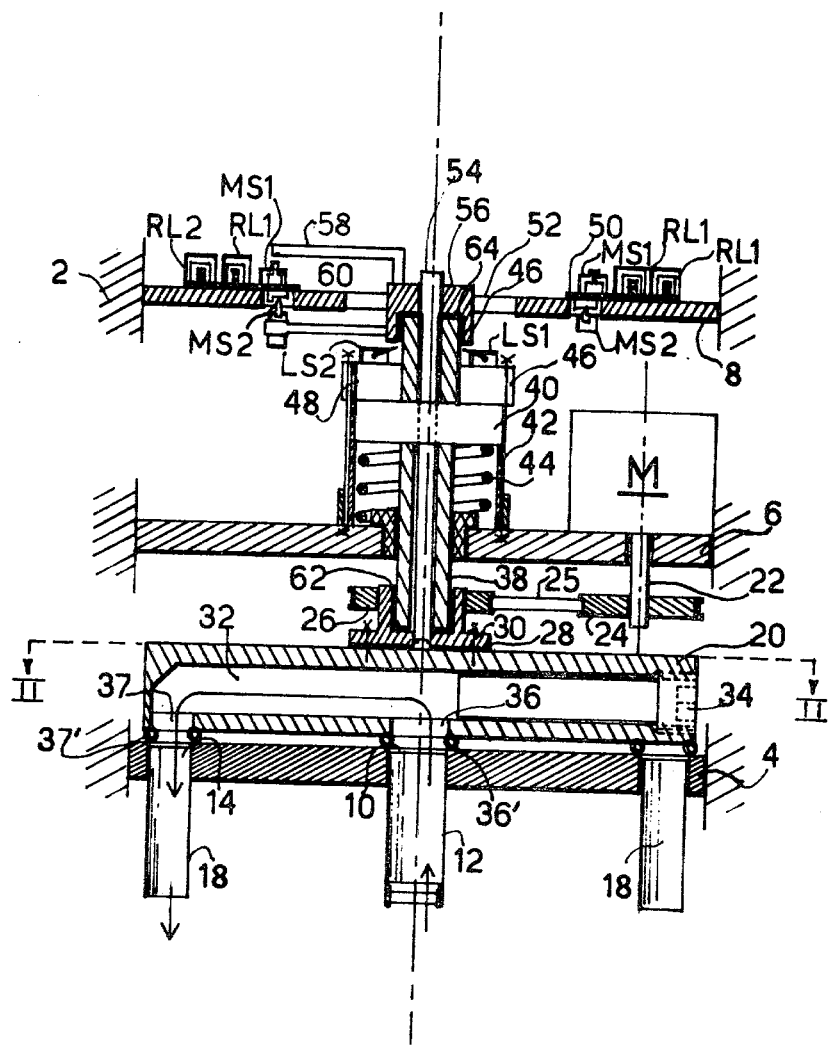
FIG. 1 is a transverse sectional view illustrating one form of fluid distributor system constructed in accordance with the invention, this system being particularly useful for rinsing and drying the many milking cups in a cow milking machine.

The apparatus illustrated in FIG. 1 comprises a frame or support, generally designated 2, fixedly supporting a distributor plate 4 to which are fixed the inlet and outlet pipes, a mounting plate 6 carrying an electric motor M as well as other elements to be described below, and a position sensor plate 8 carrying the elements of the position sensor means as also to be described below. The three plates 4, 6, 8 are all fixed to the frame 2 in parallel horizontal positions, one spaced above the other as illustrated in FIG. 1.

Figure 2:
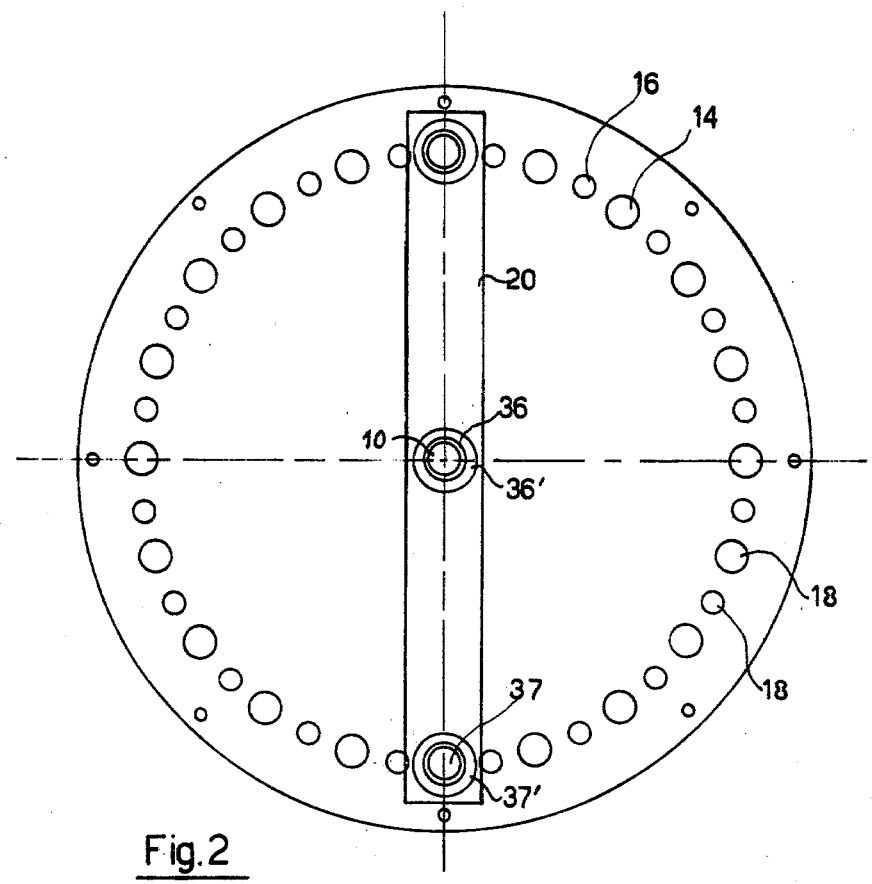
FIG. 2 is a sectional view along line II—II of FIG. 1.

Distributor plate 4 is of circular configuration and is formed with a central opening 10 (FIG. 2) serving as an inlet opening connected at one side to a fluid inlet pipe 12 (FIG. 1); a first series of openings 14 arranged in a circular array about the outer periphery of the plate; and a second series of openings 16 also arranged in a circular array but alternating with openings 14 and of smaller diameter than openings 14. Both series of openings 14 and 16 serve as outlet openings and are connected to outlet pipes 18, as shown in FIG. 1, the pipes corresponding in diameter to the diameter of the respective opening. The large openings 14 and their outlet pipes 18 serve for conducting water and air to rinse and dry the milking cups; whereas the smaller openings 16 and their outlet pipes 18 serve for conducting water and air to spray and dry the cow udder.

A rotary distributor arm 20 is rotatably mounted over the face of the distributor plate 4 opposite to the inlet pipe 12 and outlet pipes 14, 16. Distributor arm 20 is rotated by motor M via the motor shaft 22 and wheel 24 coupled by a belt 25 to a wheel 26, the latter being fixed to a flange 28 secured by fasteners 30 to the distributor arm. Distributor arm 20 is formed with a passageway 32 closed at one end by a plug 34. Arm 20 has a central opening 36 circumscribed by a sealing ring 36' and aligned with central opening 10 in the distributor plate 4, and an end opening 37 circumscribed by a sealing ring 37' and selectively alignable with the peripheral openings 14, 16 in the distributor plate.

The rotary distributor arm 20 is supported by a shaft 54 through stem 38 carried by a piston 40 movable within a cylinder 42 fixed to the upper face of the mounting plate 6. Piston 40 is urged to its upper position as illustrated in FIG. 1 by a spring 44 such that the rotary distributor arm is normally spaced above the fixed distributor plate 4. However, when the chamber 46 above piston 40 is pressurized, by the introduction of a pressurized fluid via inlet 48, the piston is caused to descend against the action of spring 44 so as to bring the rotary distributor arm 20 into contact with the fixed distributor plate 4, with the opening 36 in the distributor arm 20 aligned with the central opening 10 of the plate, and with the opening 37 of the distributor arm aligned with a selected one of the peripheral openings 14, 16 of the distributor plate according to the specific rotary position of the distributor arm.

Figure 3:
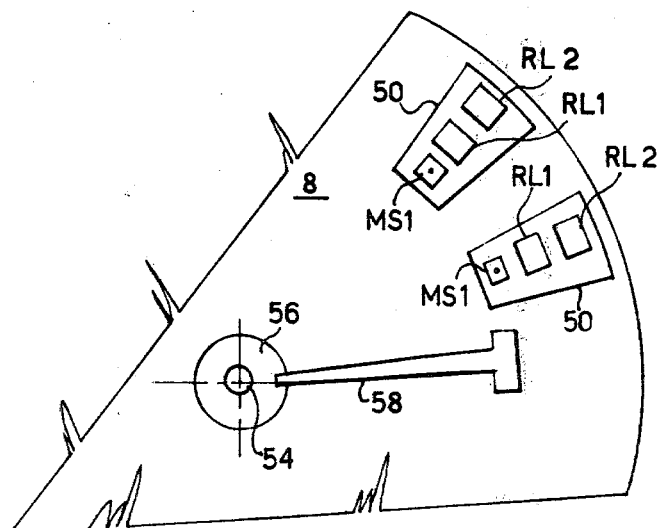
FIG. 3 is a top plan view of the apparatus illustrated in FIG. 1 and particularly showing the position sensor arrangement for controlling the rotary drive in accordance with the selected outlet pipe to receive the fluid.
Figure 4:
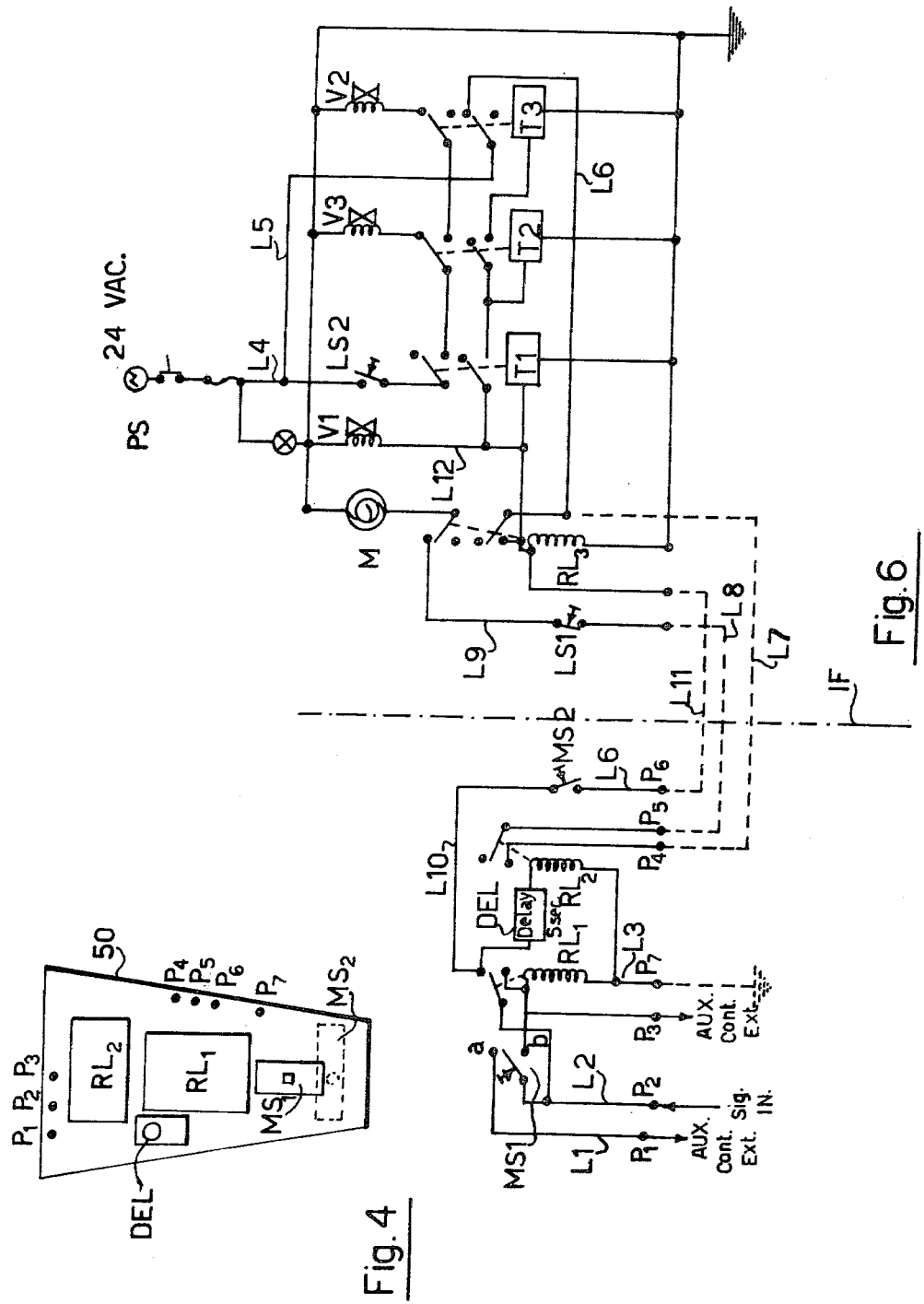
FIG. 4 is an enlarged plan view of the printed circuit board provided for each of the selectable positions of the distributor.

The rotary position of distributor arm 20 is sensed by position sensor means carried by the position sensor plate 8 fixed to the machine frame 2. The position sensor plate (FIG. 3) is also of circular configuration and includes, for each of the selectable positions or stations corresponding to the outlet pipes 18, a printed circuit board 50 (FIGS. 3 and 4) carrying a number of electrical components. These components include a first microswitch MS1 disposed on the upper face of the printed circuit board; a second microswitch MS2 depending from the lower face of the board; a pair of relays RL1, RL2; and a delay circuit DEL. The foregoing elements are connected into the electrical circuit by seven pins P1-P7 provided on the outer periphery of each printed circuit board 50.

As particularly illustrated in FIG. 1, position sensor plate 8 is formed with an enlarged opening 52 aligned with stem 38 of piston 40. A shaft 54 freely passes through an axial bore formed through stem 38. Shaft 54 is fixed at one end to flange 28 of the rotary distributor arm 20, and at the opposite end to a hub 56 carrying a pair of arms 58, 60 disposed on opposite sides of the position sensor plate 8 and overlying the microswitches MS1 and MS2 of the printed circuit boards 50. Rotary arms 58, 60 are thus rotated with the rotary distributor arm 20 via the connecting shaft 54 during the operation of motor M to position the distributor arm 20 in alignment with a selected outlet opening 18 in a manner to be described more fully below. The rotation of distributor arm 20 and rotary arms 58, 60 with respect to fixed cylinder 42 is permitted by a plastic sleeve bearing 62 interposed between flange 28 and the outer end of piston stem 38, and a second plastic sleeve bearing 64 interposed between hub 56 and the opposite end of cylinder 42.

As shown in FIG. 1, a pair of limit switches LS1, LS2 are carried by cylinder 42 and are actuated upon the movement of piston 40 to its lower position. Switch LS1 is normally closed to enable the operation of the motor, but is opened by the depression of the piston to disable the motor. Switch LS2 is normally open but is closed upon the depression of the piston to permit the flow of water and/or air to the selected outlet pipe.

Figure 5:
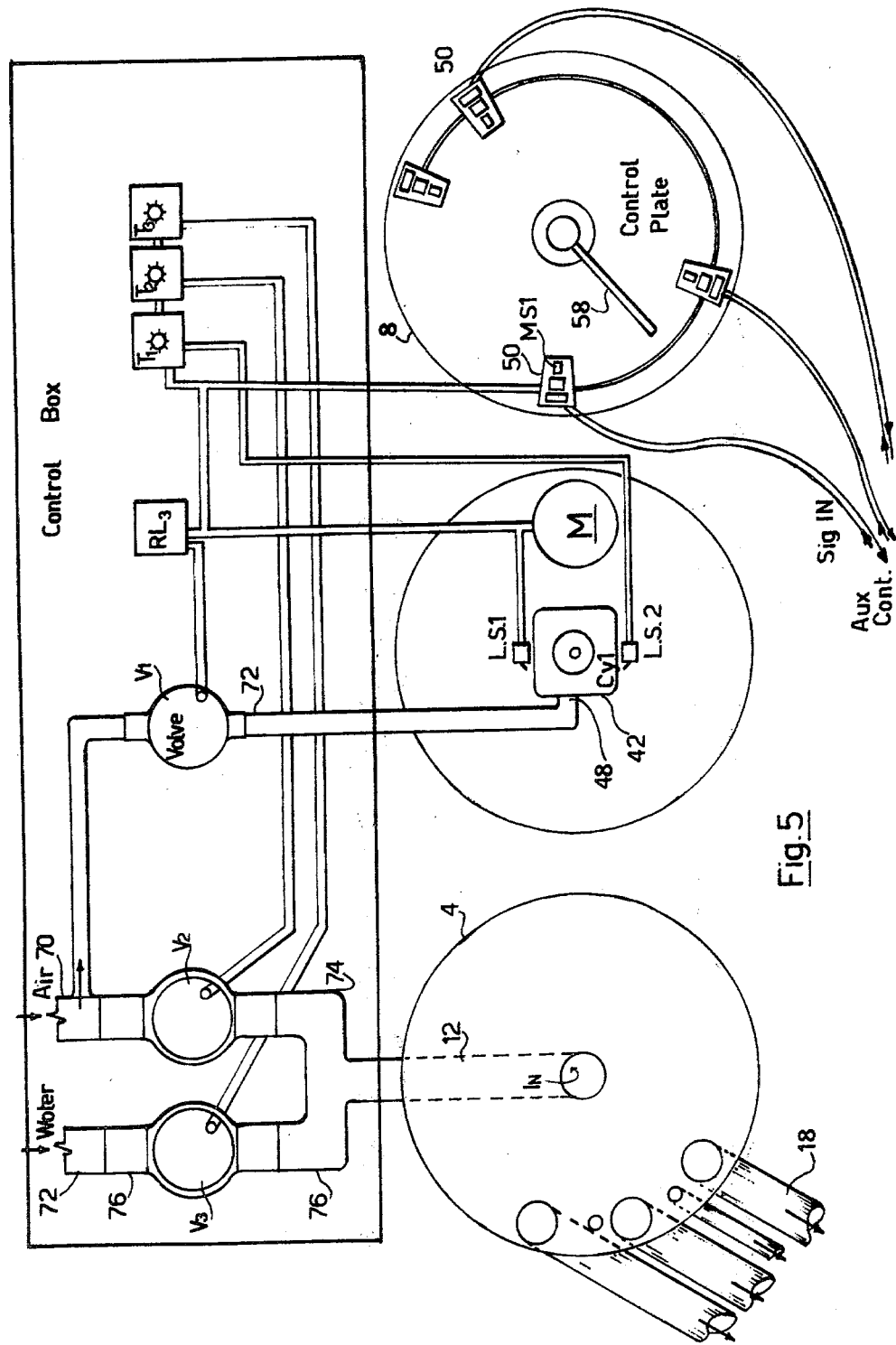
FIG. 5 is a schematic diagram of the fluid circuit in the apparatus of FIG. 1.

As shown in the fluid circuit diagram of FIG. 5, air is supplied from a source (pipe 70) to a first line 72 leading to the inlet 48 of cylinder 42, this line being controlled by a first valve V1. Air is also supplied to a second line 74 leading to the inlet pipe 12 located at the center inlet opening 10 of the rotary distributor plate 4, this line 74 being controlled by a second valve V2. A source of water (pipe 76) is also connected to inlet pipe 12 via a line 76, the latter line being controlled by a third valve V3.

It will be seen that valve V1, when opened, causes the piston 40 to move downwardly within its cylinder 42 to bring the distributor arm 20 into engagement with the distributor plate 4 to thereby provide a communication path from the fluid inlet pipe 12 to the selected outlet pipe 18; and that when valves V2 and V3 are opened, the corresponding fluid (air for valve V2, and water for valve V3) is fed via the inlet pipe 12 to the selected outlet pipe 18. The control circuit for effecting this operation, as well as the other operations of this system, are described more particularly below with respect to the overall operation of the system.

FIG. 6 illustrates the electrical circuit. It will be seen that a printed circuit board 50, including the electrical components carried thereby, is provided for each of the stations on the position sensor plate 8, there being one such station for each of the outlet pipes 18 coupled to the distributor plate 4. In the illustrated example, there are forty such outlet pipes 18, each constituting a station, and therefore there would be forty such printed circuit boards 50 for the forty stations. These elements are connected, via their connecting pins P1-P7, to further electrical components which are common to all the stations, these components being shown at the right-hand side of the interface line IF in FIG. 6. These components in the common circuit include the previously-mentioned motor M for rotating the distributor arm 20; and the previously-mentioned valves shown in FIG. 5, namely valve V1 for actuating piston 40 within cylinder 42, valve V2 for turning-on the air-supply to the distributor arm, and valve V3 for turning-on the water-supply to the distributor arm. The electrical circuit further includes the two limit switches LS1, LS2 actuated by the piston 40, a further relay RL3, and three timers T1-T3, all of whose functions are described below in connection with the description of the operation of the system.

As mentioned above, the system illustrated in the drawings is for use in a milking machine to control the supply of water and/or air to the various milking cups. In this example, there are twenty milking cup clusters (4 cups to a cluster) each cluster of which may be rinsed by water and dried by air from a larger outlet pipe 18, and twenty udder stations in each of which the udder may be sprayed by water or dried by air from a small outlet pipe 18. Accordingly, in this example, there are a total of forty outlet pipes 18, and therefore forty possible positions or stations of the distributor arm 20, and forty printed circuit boards 50 on the position sensor plate 8.

Also in this example, the particular outlet pipes 18 to be coupled to the inlet pipe 10 by the rotary distributor 20 is determined by a signal applied to pin P2 for the respective outlet pipe. In this example, this signal is generated by means not forming a part of the present invention, and therefore is not disclosed in the drawings. It is generated in the external control circuit for the milking machine whenever a milking operation has been completed with respect to a particular milking cup cluster, and is applied to pin P2 (FIG. 6) for the respective milking cup cluster. It thereby serves as a "command" for the control circuitry illustrated in FIG. 6 to couple the respective outlet pipe 18 for that milking cup cluster to the inlet pipe 12 in order to effect first a rinsing operation, and then a drying operation, for that particular milking cup cluster.

Before the external signal is received on pin P2 to initiate the foregoing operation, the electrical components are in the condition illustrated in FIG. 6: That is, all the microswitches MS1 are in their "a" position connecting pin P2 to pin P1 via lines L1, L2; and all the microswitches MS2 are in their "open" positions, thereby enabling the operation of motor M.

Whenever a signal is received on pin P2 from one of the milking stations, this informs the system that the milking operation has been completed with respect to that station and therefore the corresponding milking cup cluster has to be rinsed and sprayed. This signal on pin P2 is first applied via its respective microswitch MS1, line L1 and pin P1, to an auxillary control circuit (also not part of the present invention, and therefore not disclosed herein) to cause the teat-cups in the respective milking station to be removed. In addition, the signal applied to pin P2 is also applied to delay circuit DEL which times-out, e.g., after five seconds, to energize relay RL2 via line L3 and pin P7 connected to ground.

Energization of relay RL2 energizes the motor M from the power supply PS, this energizing circuit including lines L4–L9 and motor M to ground.

Energization of the motor M causes, via belt 25, the distributor arm 20 to be rotated with respect to the distributor plate 4; and at the same time causes, via shaft 54, the rotary arms 58, 60 to be rotated with respect to the printed circuit boards 50 carried by the position sensor plate 8. It will be appreciated that, during this rotation of the rotary distributor 20, piston 40 is in its normal, elevated position within cylinder 42. In this normal position, the rotary distributor 20 is spaced above the distributor plate 4, and the lower rotary arm 48 is engagement with the microswitches MS2 on the underside of the printed circuit boards 50 carried by the position sensor plate 8.

As the rotary arm 48 passes over each of the microswitches MS2, it actuates each to close same, but nothing occurs until the rotary arm 48 closes the microswitch MS2 for the respective station on which the external "command" signal was received on pin P2. When this occurs, relay RL3 is energized, via pin P2, line L10, microswitch MS2 line L6, P6 line L11 and relay RL3 to ground.

The energization of relay RL3 causes a number of things to occur: first, it opens the circuit to the motor M to terminate its operation; in addition, it completes a circuit to actuate valve V1 via line L12 thereby introducing pressurized air into the cylinder, causing the piston 40 to move to its lowermost position; further, it turns on timer T1.

The actuation of piston 40 to its lower position within cylinder 42 drives the rotary distributor arm 20 in the axial direction so as to bring its outlet end 37 into communication with the outlet pipe 18 for the respective station. In addition, the lower end of piston 40 moves the lower rotary arm 60 out of engagement with the actuated microswitch MS2, and causes the higher arm 58 to move into engagement with the microswitch MS1 for the corresponding station. Microswitch MS2 for that station is therefore turned-off, whereas microswitch MS1 for that station is actuated to its position "B". In addition, the lowering of piston 40 actuates limit switch LS1 to open same, and thereby to disable the motor from operation; and further actuates limit switch LS2 to close same, and thereby to enable the introduction of fluid to the selected pipe 18, as described more particularly below.

When microswitch MS1 for the respective station is actuated to its position "b" by the lowering of piston 40 as described above, this causes a number of things to occur, namely: it de-energizes relay RL2; it energizes relay RL1; and it disconnects the auxillary control circuit connected to pin P1, from the line of the selected station producing the "command" signal applied to pin P2.

Timer T1, which was actuated upon the energization of relay RL3 to turn-off the motor M and to pull-down the piston 40, times out after a predetermined time preset on the timer, e.g., from zero to 10 seconds. As soon as timer T1 times-out, it causes valve V3 to be actuated to turn-on the water supply from source 76 (FIG. 5), this circuit including the power supply PS, control switch LS2, and valve V3.

The timing-out of timer T1 also actuates timer T2 (also presettable from 0–10 seconds) which de-energize valve V3 to turn-off the water supply; energizes valve V2 to turn-on the air supply; and actuates timer T3.

When timer T3 times-out (also presettable from 0–10 seconds), valve V2 is de-energized to turn-off the air supply. In addition, relay RL3 is de-energized, which causes the timers to be reset, and valve V1 to be de-energized, whereupon piston 40 returns to its normal upper position under the influence of spring 44.

The operation for that particular station has thereby been completed, with the parts in their normal position until another "command" signal is received from another station via pin P2 of the respective station, this signal also informing that a milking operation has been completed with respect to another milking cup cluster and thereby commanding the described fluid distribution system to introduce water and air to the outlet pipe corresponding to that station in order to rinse and dry the milking cups for that station.

As noted above, the outlet pipes 18 connected to the outlet openings 14 and 16 of the distributor plate 4 are of two sizes, namely a larger size 14 and a smaller size 16. This is desirable in the particular application described above, since the larger outlet pipes connected to the larger openings 14 are used for conducting first water in order to rinse the milking cup cluster, and then air in order to dry it, as described above; whereas the smaller outlet pipes 18 connected to the smaller opening 14 are used for conducting water and air to spray and dry the cow udder at the respective station.

While the invention has been described with respect to a particular application for milking machines, it will be appreciated that it can be used in many other applications requiring the distribution of one or more fluids to select ones of a large number of outlet pipes. In addition, while a control circuit including conventional electrical components has been described, it will be appreciated that the control circuit could be implemented by other means, for example a microprocessor. Many other variations, modifications and applications of the invention will be apparent.

What is claimed is:

1. A fluid distributor system, comprising: a circular distributor plate formed with a central opening connected at one side of the plate to a fluid inlet pipe and a plurality of outlet openings arranged in a circular array around the outer periphery of the distributor plate and each connected at said one side of the plate to one of a plurality of outlet pipes; a rotary distributor arm rotatably mounted on an axis passing through the center of said distributor plate and in spaced relationship with respect to its opposite side, said distributor arm being formed with a passageway having an inlet at its center aligned with said inlet opening, and an outlet at its end selectively alignable with one of said peripheral outlet openings according to the selected rotary position of the distributor arm; rotary drive means for rotating said distributor arm to a selected rotary position; and axial drive means effective, when the distributor arm is rotated to a selected position, to move the distributor arm axially against the distributor plate to bring the inlet end of the distributor arm passageway into communication with the discharge plate inlet opening, and the outlet end of the distributor arm passageway into communication with the selected outlet opening of the distributor plate, said axial drive comprising a fluid motor having a cylinder and piston, one of which is fixed with respect to said distributor plate, and the other of which is coupled to said distributor arm.

2. A system according to claim 1, wherein said rotary drive means comprises a rotary motor coupled to said distributor arm to rotate same, and position sensor means sensing the position of said distributor arm and controlling said motor in response thereto.

3. A system according to claim 2, wherein said position sensor means comprises a position sensor plate including a plurality of sensor members located thereon in a circular array corresponding to the location of the outlet openings in the distributor plate.

4. A system according to claim 3, wherein said position sensor plate is fixed with respect to said distributor plate and cooperates with a rotary arm coupled to rotate with said distributor arm.

5. A system according to claim 4, wherein said plurality of sensor members are electrical switches actuated by said rotary arm as it rotates over said one face of the position sensor plate.

6. A system according to claim 5, wherein said position sensor plate includes a second series of electrical switches on the opposite face thereof, said latter switches being cooperable with a second rotary arm coupled to said first-mentioned rotary arm to control the supply of fluid to the selected fluid outlet pipe.

7. A system according to claim 6, further including control means effective, when said first-mentioned rotary selector arm on said one side of the position sensor plate reaches the position sensor member corresponding to the selected outlet opening in the distributor plate, to terminate the operation of the rotary drive and then to actuate the axial drive, whereupon the rotary selector arm on said opposite face of the position sensor plate actuates the respective switch on said opposite side of the position sensor plate to turn-on the flow of the fluid via the fluid inlet pipe and rotary distributor arm to the selected outlet pipe for a predetermined time, and then to permit said axial drive to return the rotary distributor arm to its normally spaced position with respect to the distributor plate.

8. A system according to claim 7, wherein said fluid inlet pipe is connected to a plurality of different fluid sources, each including a control valve controlled by said control means.

9. A system according to claim 8, wherein said different fluid sources include a source of water and a source of air.

10. A system according to claim 9, wherein said control means controls the water and air sources to turn-on the water source for a predetermined time interval to effect a rinsing operation, and subsequently to turn-on the air source for a predetermined time interval to effect a drying operation.

* * * * *